No. 670,724. Patented Mar. 26, 1901.
M. PAYNE.
VEHICLE RUNNING GEAR.
(Application filed Dec. 27, 1900.)
(No Model.)
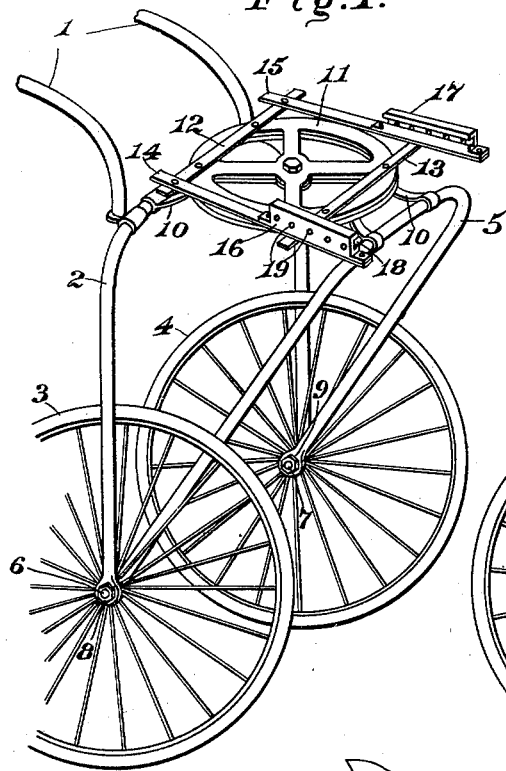
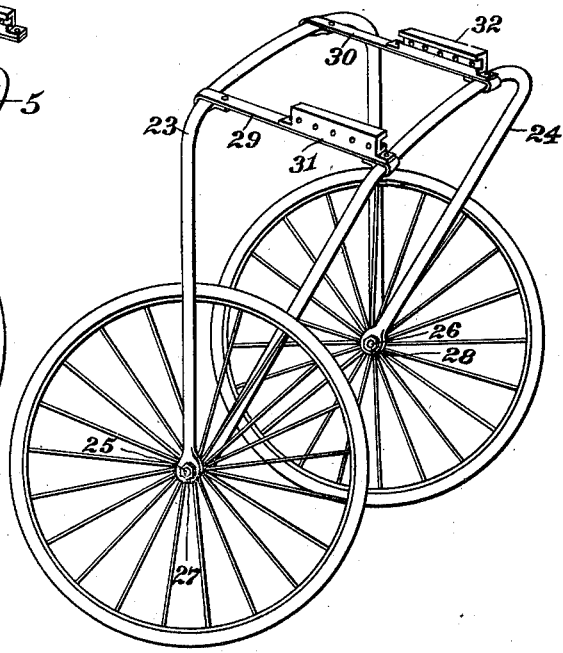
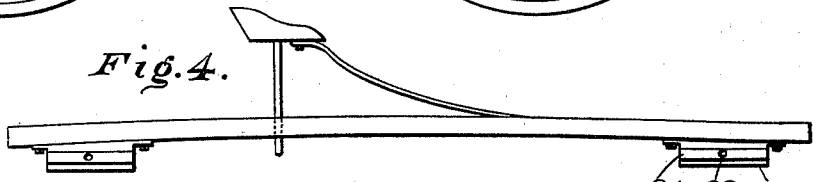
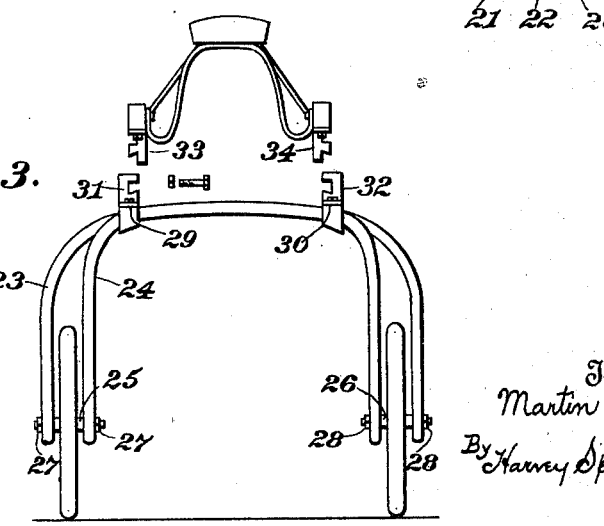
Witnesses
Jas. S. Smith
Edwin Guthrie
Inventor
Martin Payne,
By Harvey Spalding and Sons.
Attorney

UNITED STATES PATENT OFFICE.

MARTIN PAYNE, OF TROY, NEW YORK.

VEHICLE RUNNING-GEAR.

SPECIFICATION forming part of Letters Patent No. 670,724, dated March 26, 1901.

Application filed December 27, 1900. Serial No. 41,245. (No model.)

*To all whom it may concern:*

Be it known that I, MARTIN PAYNE, a citizen of the United States, residing at Troy, in the county of Rensselaer and State of New York, have invented certain new and useful Improvements in Vehicle Running-Gear; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to vehicle running-gear, more particularly to running-gear employed for light road or business wagons, or those intended to be drawn at high speed, the constructor of which must necessarily eliminate all possible weight consistent with leaving sufficient strength in the parts to withstand the usage ordinarily given them.

The object of my invention is to produce a special form of running-gear of the character stated that will cause the load to be supported in rear of each axle or of an imaginary line joining the axes of the pairs of wheels. To attain this object, I provide each pair of wheels with two arched axles, one extending upwardly in a direct vertical plane from the hubs of each pair of front and back wheels and the second axle in each instance extending in a plane inclined toward the rear. Upon the rearwardly-inclined axles the entire load is mainly upheld.

Each constituent element of my invention is described in detail and its individual office, together with the mode of operation of the whole, fully explained hereinbelow.

Of the accompanying drawings, throughout which like numerals refer to like parts, Figure 1 represents the front wheels and axles; Fig. 2, the rear wheels and axles; Fig. 3, a rear view of the hind wheels and body portion, exhibiting the separable clamping devices by which the body and wheels are held together; and Fig. 4 is a preferred form of body or seat support for use with the gear as a speed-wagon.

Considering the drawings, numeral 1 marks the thills, coupled in any chosen manner to the vertical axle 2 of the front wheels 3 and 4. This forward axle is normally in a vertical plane, and it will be noted that its extremities reach downwardly to the hubs upon the outside of the wheels. The rearwardly-inclined axle of the front wheels is designated by numeral 5, and the extremities of this axle reach down between the wheels. The wheels turn upon the spindles 6 and 7, and to these spindles the axles are secured by means of the nuts 8 and 9. It will be understood that there are two nuts 8 for the front axle and two nuts 9 for the rearwardly-inclined axle 5, although but one nut each is shown. Otherwise than by means of the spindles axles 2 and 5 are not connected with each other in any manner save at the top, where arms 10 10 of a fifth-wheel device 11 are connected with the axles. The upper member of the fifth-wheel supports the cross-bars 12 and 13, and these in turn are connected by the side rods 14 and 15, parallel with each other and at right angles to the cross-bars. Toward the rear end of the rods are bolted the female members 16 and 17 of the clamping devices introduced to secure the body of the wagon upon the front wheels of the running-gear. A description of one of these female clamping members—for example, that numbered 16—will answer for all. There are four of these, and each is precisely like the other. They are straight pieces of wrought iron or steel, each having a groove, such as groove 18, extending longitudinally and provided with bolt-holes 19 19, bored at intervals through the body of the piece at the bottom of the groove. The grooves are slightly expanded toward the bottom, and the tongues upon the male members of the clamping devices are of corresponding form. There are two male clamping members for the front pair of wheels. One of these is shown in Fig. 4 and designated by number 20. The construction of the male members, of which there are four, is precisely the same for each. Member 20 has a tongue 21 extending lengthwise, and about the middle point of the tongue a bolt-hole 22 is bored. It is believed to be clear that if tongue 21 is slipped into groove 18 of the complementary member the two may be bolted together in as many different positions as there are bolt-holes 19 19 in the female member. In this manner the load can be shifted toward the rear or toward the front, as more fully explained hereinafter.

As a substitute for the usual springs in connection with the running-gear I provide the wheels with rubber tires, either inflated or solid.

Considering Fig. 2, numeral 23 marks the front axle; numeral 24, the rearwardly-inclined axle; numerals 25 and 26, the spindles upon which the wheels turn, and numerals 27 27 and 28 28 the axle-nuts. As already stated with reference to the front axles, these rear axles are not joined together between the spindles and the top, where they are connected by rods 29 and 30, parallel with each other and similar in position and office to the rods 14 and 15. (See Fig. 1.) Bolted to the side rods are the two female members 31 and 32 of the rear-wheels clamping device. The male members are shown in Fig. 3, (designated by numerals 33 and 34.) The elements just described duplicate exactly those relating to the front wheels.

I reserve the right to use any sort of wagon-body with the running-gear herein described.

The spring-supported seat illustrated merely shows the form preferred for speed-wagons, and it may be easily and quickly removed and replaced by a box-body useful for business purposes.

If the body 35 be placed upon the wheels, the tongues and grooves of the clamping members being in engagement, as indicated and described, and those members bolted together, the weight of the rider will fall almost wholly upon the rearwardly-inclined axles of each pair of front and hind wheels. The advantage of this construction and arrangement has been determined by experiment. I have found by actual trial that a person seated in a vehicle embodying my invention when the vehicle is at rest upon a perfectly-level floor can start and propel it forward by simply maintaining an up-and-down bouncing movement comparable to that produced by the actual behavior of the wagon when drawn along the ordinary roadway. When the wagon is employed for business purposes with a box-body carrying usually a relatively heavy load, it is advantageous that the weight be borne farther forward than when the speed wagon-body is in use and the load only that of the driver. As far as I am able to ascertain, the propelling action just described is due to placing the weight well to the rear of a direct line joining the hubs of the pairs of wheels, and this action is a distinct aid to the horse and enables greater speed to be attained than with the ordinary running-gear.

I am aware that arched axles have been employed, one being vertical and another, relating to the same pair of wheels, being inclined; but I am not aware of any vehicle being constructed wherein the inclined axles always extend to the rear and in which the load may be rearwardly located, as set out herein.

What I claim, and desire to secure by Letters Patent of the United States, is—

1. In vehicle running-gear, the combination of suitable axles, a body or seat support, and clamping devices adapted to hold the said body and axles together and whereby the weight of the load may be supported in rear of the ends of said axles, substantially as described.

2. In vehicle running-gear, the combination of suitable axles, a body or seat support, and adjustable clamping devices adapted to hold the said body and axles together and whereby the weight of the load may be supported at different distances in rear of the ends of said axles, substantially as described.

3. In vehicle running-gear, the combination of a vertical arched axle, a rearwardly-inclined arched axle, spindles joining the ends of the said axles, rods connecting the tops of said axles, a body or seat support, and adjustable clamping devices adapted to hold the said body and axles together and whereby the weight of the load may be supported at different distances in rear of the said vertical axle, substantially as described.

In testimony whereof I affix my signature in presence of two witnesses.

MARTIN PAYNE.

Witnesses:
 WALTER F. MEAD,
 WM. D. O'CONNELL.